P. H. JOHNSON.
MEANS OF SUSPENSION OF VEHICLES.
APPLICATION FILED MAY 12, 1919.

1,330,119.

Patented Feb. 10, 1920.

Inventor:
Philip Henry Johnson
By his Attorneys

UNITED STATES PATENT OFFICE.

PHILIP HENRY JOHNSON, OF BECKENHAM, ENGLAND.

MEANS OF SUSPENSION OF VEHICLES.

1,330,119.    Specification of Letters Patent.    Patented Feb. 10, 1920.

Application filed May 12, 1919. Serial No. 296,561.

*To all whom it may concern:*

Be it known that I, PHILIP HENRY JOHNSON, a subject of the King of Great Britain, residing at St. Barnabas Vicarage, Beckenham, Kent, England, have invented new and useful Improvements in Means of Suspension of Vehicles, of which the following is a specification.

This invention relates to vehicles of the endless track type having an articulated rail or independent track shoes and relates to vehicles which are suspended in accordance with the invention described in my concurrent application filed May 12, 1919, No. 296,562, the vehicles being so suspended that shocks caused by obstacles, undulations or irregularities of the surface traveled over are absorbed and the load due to the weight of the vehicle is distributed by compensation over the various points of support.

In this specification the word "rope" is used to describe any flexible connection.

According to this invention a plurality of pulleys is mounted in a plane at intervals along the vehicle, and a plurality of other pulleys is arranged alternately to the first set, and a rope is passed under the pulleys of one set and over the pulleys of the other set alternately, and one set of pulleys is carried on bogies sliding between plates on the vehicle and running on an endless track. The rope is secured to the vehicle and springs may be provided to increase the elasticity of the system and diminish shock to the rope. More than one rope is usually employed, pulleys to carry them being arranged accordingly.

The drawings illustrate apparatus made in accordance with this invention.

Figure 1:
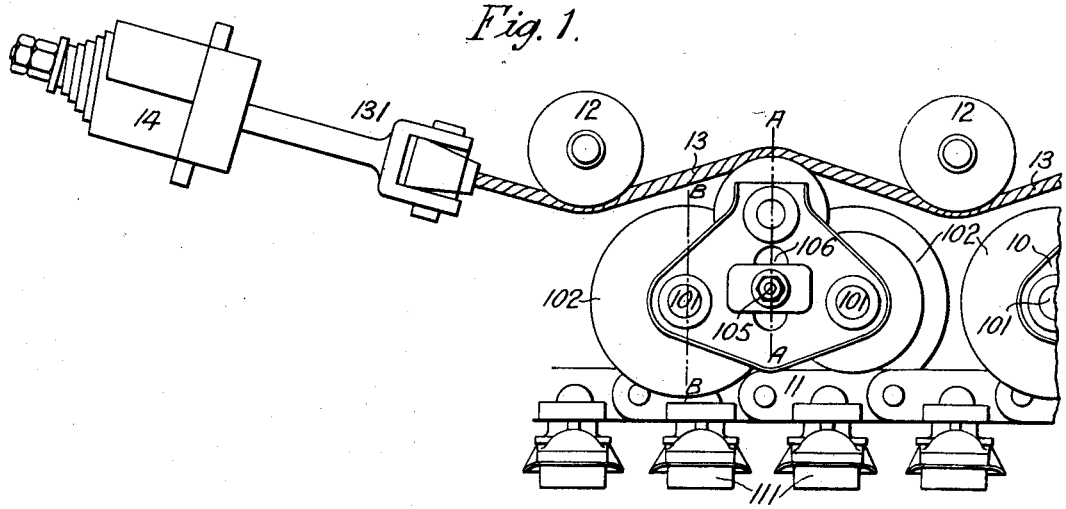
Figure 2:
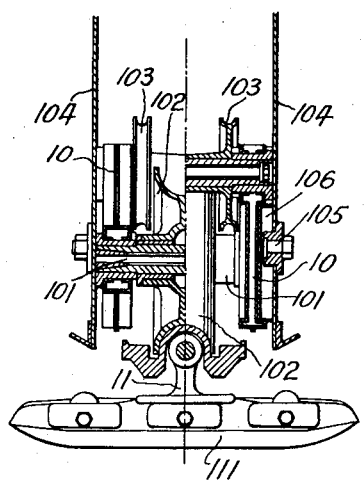

Figure 1 is a side elevation with the plates removed, and Fig. 2 is a section on the lines A—A, B—B, Fig. 1.

The vehicle is supported by a number of bogies 10 each having two axles 101 on which are wheels 102 running on an articulated rail 11 mounted on track shoes 111, and on each bogie 10 are two pulleys 103 and on the vehicle are two sets of pulleys 12, ropes 13 secured to the vehicle passing under the pulleys 12 and over the pulleys 103. The ropes 13 are secured to the front end of the vehicle by a T piece 131, the stem of which is attached to a spring 14 and the ropes 13 are secured to the other end if desired in a similar manner. The bogies 10 are guided by plates 104 on the vehicle, pins 105 secured to the plates entering slots 106 in the bogies.

What I claim is:—

1. A vehicle combined with a plurality of pulleys arranged at intervals along the vehicle, a plurality of other pulleys arranged alternately to the first set and carried on bogies sliding between plates on the vehicle and running on an endless track and a spring secured to the vehicle and a rope attached to the spring and passing under the pulleys of one plurality and over the pulleys of the other plurality alternately.

2. A vehicle combined with a plurality of pulleys arranged at intervals along the vehicle, a plurality of other pulleys arranged alternately to the first set and carried on bogies sliding between plates on the vehicle, axles on the bogies, wheels on the axles, track shoes, an articulated rail on the track shoes, a spring secured to the vehicle and a rope attached to the spring and passing under the pulleys of one plurality and over the pulleys of the other plurality alternately.

3. A vehicle combined with two pluralities of pulleys arranged at intervals along the vehicle, two pluralities of other pulleys arranged alternately with the first set and carried on bogies sliding between plates on the vehicle and running on an endless track, a spring secured to the vehicle and two ropes attached to the spring and each passing under the pulleys of one plurality and over the pulleys of the other plurality.

In testimony that I claim the foregoing as my invention I have signed my name this 23rd day of April, 1919.

PHILIP HENRY JOHNSON.